US006474204B1

(12) United States Patent
Suzuki et al.

(10) Patent No.: US 6,474,204 B1
(45) Date of Patent: Nov. 5, 2002

(54) PROCESS FOR PRODUCING SUBSTRATE FOR PHOTOSENSITIVE DRUM AND SUBSTRATE FOR PHOTOSENSITIVE DRUM

(75) Inventors: Yasunori Suzuki; Kenichi Asano, both of Kanagawa-ken (JP)

(73) Assignee: Naito Manufacturing Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/691,619

(22) Filed: Oct. 18, 2000

(30) Foreign Application Priority Data

Oct. 21, 1999 (JP) .......................................... 11-299739

(51) Int. Cl.[7] ............................ B23B 1/00; B23B 3/00; G03G 21/00

(52) U.S. Cl. ............................... 82/13; 82/56; 428/612

(58) Field of Search ............................. 428/612; 82/13, 82/56

(56) References Cited

U.S. PATENT DOCUMENTS

| | | | | |
|---|---|---|---|---|
| 4,617,245 | A | * | 10/1986 | Tanaka et al. |
| 5,692,287 | A | * | 12/1997 | Nakamura et al. |
| 5,749,274 | A | * | 5/1998 | Chiba |
| 5,887,498 | A | * | 3/1999 | Miyamoto et al. |
| 6,072,968 | A | * | 6/2000 | Nomura et al. |
| 6,120,955 | A | * | 9/2000 | Takutake et al. |

FOREIGN PATENT DOCUMENTS

| | | | |
|---|---|---|---|
| DE | 4343183 | | 6/1994 |
| EP | 200468 | | 4/1986 |
| JP | 06 194 857 | * | 7/1994 |

* cited by examiner

*Primary Examiner*—Deborah Jones
*Assistant Examiner*—Jason Savage
(74) *Attorney, Agent, or Firm*—David G. Conlin; John B. Alexander; Edwards & Angell, LLP

(57) ABSTRACT

The present invention relates to a process for producing a substrate for a photosensitive drum, comprising machining a cylindrical stock tube by a turning tool to form a cylindrical substrate having a surface roughness of 0.5 to 5 μm and being provided on the surface thereof with the streaks extending in the approximately circumferential direction thereof, said turning tool being constituted by monocrystalline diamond and having a cutting edge provided with a saw-like portion along an effective cutting length thereof, and a substrate which is suitable for the production of a photosensitive drum being free from the occurrence of interference fringes and has fine streaks uniformly formed on the surface thereof by machining without burrs, and the substrate capable of producing a higher-quality photosensitive drum.

Such a substrate is suitable for the production of a photosensitive drum being free from the occurrence of interference fringes and has fine streaks uniformly formed on the surface thereof by machining without burrs.

6 Claims, 4 Drawing Sheets

FLANK OF MONOCRYSTALLINE
DIAMOND TURNING TOOL (×400)

FLANK OF MONOCRYSTALLINE DIAMOND TURNING TOOL (×400)

CUT SURFACE MACHINED BY MONOCRYSTALLINE DIAMOND TURNING TOOL (×400)

CUT SURFACE MACHINED BY MONOCRYSTALLINE DIAMOND TURNING TOOL (×400)

CUT SURFACE MACHINED BY POLYCRYSTALLINE DIAMOND TURNING TOOL (×400)

CUT SURFACE MACHINED BY POLYCRYSTALLINE DIAMOND TURNING TOOL (×400)

PROCESS FOR PRODUCING SUBSTRATE FOR PHOTOSENSITIVE DRUM AND SUBSTRATE FOR PHOTOSENSITIVE DRUM

BACKGROUND OF THE INVENTION

The present invention relates to a process for producing a substrate for photosensitive drum a substrate which is suitable for the production of a photosensitive drum being free from the occurrence of interference fringes and has fine streaks uniformly formed on the surface thereof by machining without burrs, and the substrate capable of producing a higher-quality photosensitive drum. More particularly, the present invention relates to a process for producing a substrate which is suitable for the production of a photosensitive drum being free from the occurrence of interference fringes and has fine streaks uniformly formed on the surface thereof by machining without burrs, and the substrate capable of producing a higher-quality photosensitive drum.

As is well known in the art, a photosensitive drum (cylindrical electrophotographic photosensitive member) includes a cylinder-shaped substrate (photosensitive drum substrate) made of aluminum or an aluminum alloy, and a photosensitive film as a photosensitive layer formed on the surface of the substrate. The substrate for such a photosensitive drum has been generally produced by machining the surface of a drawn stock tube to obtain a drum body having a high-precision shape and then subjecting the surface of the thus obtained drum body to surface-smoothening treatments (such as mirror finishing or predetermined surface-roughening treatment) by precision-machining using a diamond turning tool or the like.

In FIG. 5, there is schematically shown a structure of a cutting edge of a diamond turning tool used for the production of conventional photosensitive drum substrates as viewed from a front flank side of a tip of the turning tool. FIGS. 6 and 7 are enlarged photographs each showing a surface condition of a substrate for photosensitive drum which is machined by the conventional diamond turning tool. Namely, in the production of the conventional substrate for photosensitive drum, the turning tool having the cutting edge shown in FIG. 5 is used so as to smoothen the surface of the substrate as a whole as shown in FIGS. 6 and 7.

For example, in Japanese Patent Application Laid-Open (KOKAI) No. 6-194857(1994), there is described a process for producing a substrate for photosensitive drum in which the surface of the substrate is finished into a surface roughness of about 0.2 to 1 $\mu$m using a diamond turning tool. The diamond turning tool used in the above process includes a major cutting edge constituted by a rake face and a side flank thereof, and a minor cutting edge formed by the intersection of the rake face and a front flank thereof, and the major and minor cutting edges are constituted by many particles of diamond. Further, the front flank thereof is provided with a polished surface having no polishing scores. Also, a peripheral edge of the minor cutting edge is finished by grinding with whetstone for removing large irregularities of diamond particles therefrom.

On the other hand, in order to enhance a quality of the photosensitive drum, it is extremely important that the substrate therefor has a smooth surface. However, it is known that when the surface smoothness of the substrate is too high, interference fringes (moire) are caused on a photosensitive layer formed on the substrate when scanning the surface of the photosensitive drum by a laser beam. For this reason, there have been studied such a method of machining the substrate using a turning tool having a cutting edge with saw-like portion (irregularity portion) for forming fine streaks on the surface thereof, thereby causing irregular reflection of light on the surface of the photosensitive layer of the photosensitive drum to inhibit the occurrence of the interference fringes thereon.

Meanwhile, in such a production method, fine split burrs which are actually invisible by eyes, tend to be formed on the surface of the machined substrate as shown in FIGS. 6 and 7, which burrs are located at portions surrounded by circles. Also, even if the substrate is machined by the above-described turning tool having many particles of diamond cutting edge with saw-like portion to form fine streaks on the surface thereof, the non-uniformity of depths of the respective streaks is caused. The formation of such non-uniform streaks and burrs upon machining are considered to be problems peculiar to turning tools made of many particles of diamond.

Namely, as shown in FIG. 5, the above-described many particles of diamond cutting edge is formed by subjecting diamond particles to sintering treatment and then flattening the surface of the obtained product by polishing. For this reason, the diamond particles exposed on the surface of the cutting edge are actually not only different in size from each other but also irregularly oriented. Accordingly, even though the many particles of diamond cutting edge is provided therealong with regular irregularities, the shape of the cutting edge is non-uniform, and especially the depths of concaves between the diamond particles forming the cutting edge become uneven. This sometimes results in failure to sufficiently inhibit the occurrence of interference fringes on the obtained photosensitive drum. In particular, the burrs on the surface of the substrate cause significant problems upon the formation of a photosensitive layer thereon, which leads to defective images caused by the photosensitive drum.

SUMMARY OF THE INVENTION

The present invention has been made in view of the above problems. It is an object of the present invention to provide a process for producing a substrate suitable for the production of a photosensitive drum being free from the occurrence of interference fringes thereon, which is capable of forming uniform fine streaks on the surface thereof without burrs when the surface of a stock tube is surface-smoothened by machining.

It is another object of the present invention to provide a substrate for photosensitive drum which has uniform streaks on the surface thereof without burrs, and is capable of producing a photosensitive drum having a higher quality.

To accomplish the aims, in a first aspect of the present invention, there is provided a process for producing a substrate for a photosensitive drum, which comprises machining a surface of a cylindrical stock tube by a turning tool in order to form a cylindrical substrate having a surface roughness of 0.5 to 5 $\mu$m and having, on the surface thereof, streaks extending in the approximately circumferential direction thereof, the said turning tool being constituted by monocrystalline diamond and having a cutting edge provided with a saw-like portion (irregularity portion) along an effective cutting length thereof.

BRIEF DESCRIPTIONS OF THE DRAWINGS

DETAILED DESCRIPTION OF THE INVENTION

Figure 1:
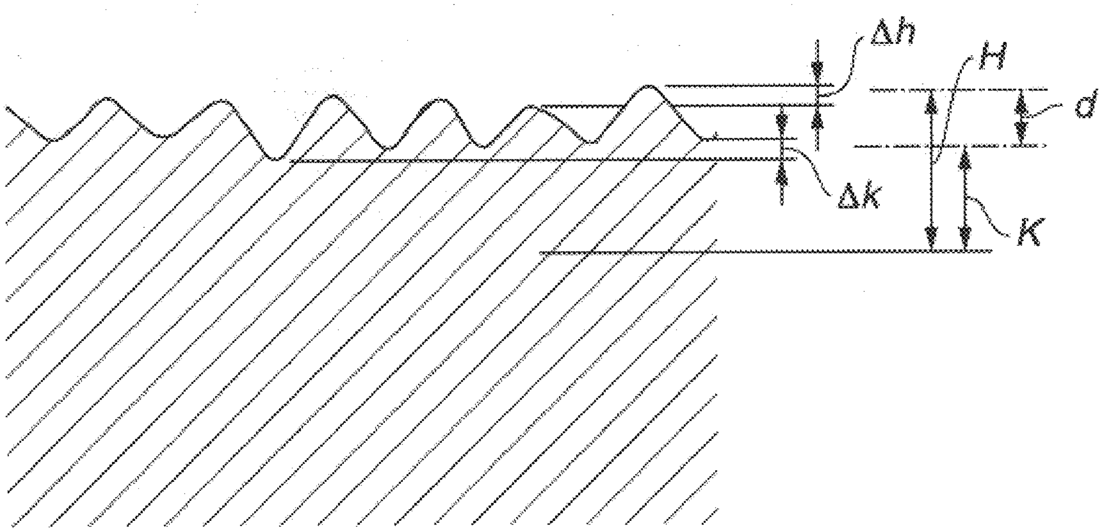
FIG. 1 is a schematic view showing a structure of a cutting edge of a diamond turning tool used in the present invention.

In the production process of the present invention, a cylindrical stock tube is machined by the specific turning tool to produce a cylindrical substrate for photosensitive drum having a predetermined surface roughness. In this case, the cutting edge of the specific turning tool has a sharp edge shape and, therefore, can exhibit an excellent cutting quality. In addition, since the cutting edge is preliminarily provided with predetermined saw-like portion, it is possible to uniformly produce fine streaks on the surface of the substrate without burrs.

Further, according to the above production process, the saw-like portion of the cutting edge are preferably formed over a region extending from the cutting edge up to the flank thereof. By using the turning tool having such a cutting edge, fine cut chips generated upon machining can be smoothly discharged through the saw-like portion continuously extending toward the flank of the cutting edge, thereby surely preventing the formation of burrs.

Also, in a preferred form of the above production process, the saw-like portion formed on the cutting edge of the turning tool have projections having a difference in peak height between each projection of usually 0 to 1 μm, and concaves having a difference in minimum height between each concave of 0 to 1 μm and an average depth of usually 0.5 to 5 μm based on an average peak height of the projections. By adjusting the projections and concaves of the saw-like portion formed on the cutting edge of the turning tool to the above-specified ranges, respective cutting forces at the projections and concaves of the cutting edge can be equalized, thereby more surely preventing the generation of burrs. In addition, when the projections of the saw-like portion formed on the cutting edge of the turning tool have a density of usually 10 to 350 peaks/mm, the substrate machined by the turning tool can be provided on the surface thereof with such streaks which are so arranged as to effectively prevent the occurrence of interference fringes on the photosensitive layer.

Further, in another aspect of the present invention, there is provided a substrate for a photosensitive drum produced by the above-described process, which has a surface roughness of usually 0.5 to 5 μm, and has a difference in peak height between each projection of usually 0 to 1 μm, a difference in minimum height between each concave of usually 0 to 1 μm and an average depth of the concaves of usually 0.5 to 5 μm based on an average peak height of the projections, and is provided on a surface thereof with the streaks extending in the approximately circumferential direction thereof without burrs. That is, in the case where the substrate for photosensitive drum has such a structure that the surface roughness thereof is adjusted to the above-specified range and the streaks are formed in the approximately circumferential direction thereof without burrs, the photosensitive layer formed thereon can be prevented from suffering from various defects as well as occurrence of interference fringes.

In the preferred form of the substrate for photosensitive drum for further ensuring the prevention of occurrence of the interference fringes, the streaks have projections having a difference in peak height between each projection of usually 0 to 1 μm, and concaves having a difference in minimum height between each concave of usually 0 to 1 μm and an average depth of usually 0.5 to 5 μm based on an average peak height of the projections. In the more preferred form of the substrate for photosensitive drum, the streaks have a density of usually 10 to 350 peaks/mm.

PREFERRED EMBODIMENTS OF THE INVENTION

Figure 2:
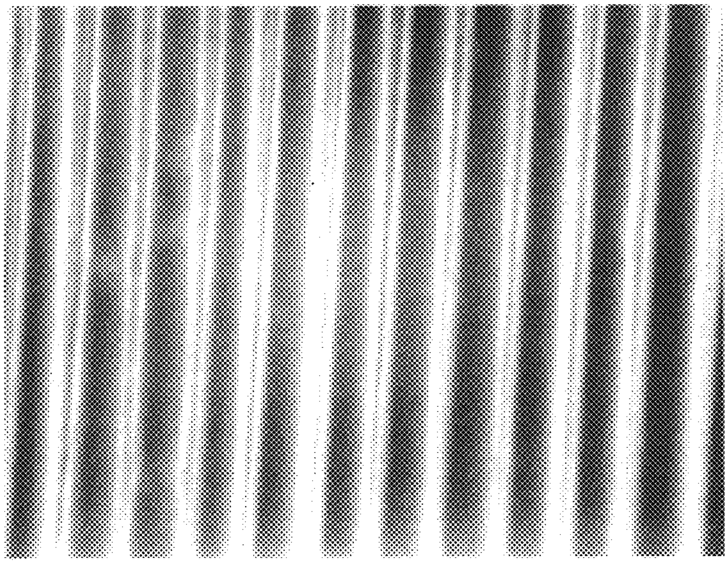
FIG. 2 is an enlarged photograph showing saw-like portion formed on a front flank of the diamond turning tool having the cutting edge shown in FIG. 1.
Figure 3:
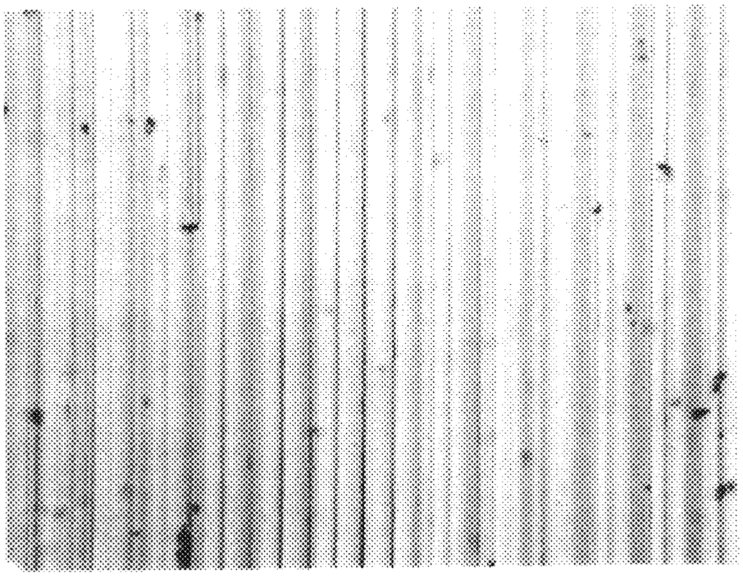
FIG. 3 is an enlarged photograph showing a surface condition of a substrate for photosensitive drum machined by the diamond turning tool having the cutting edge shown in FIG. 1.
Figure 4:
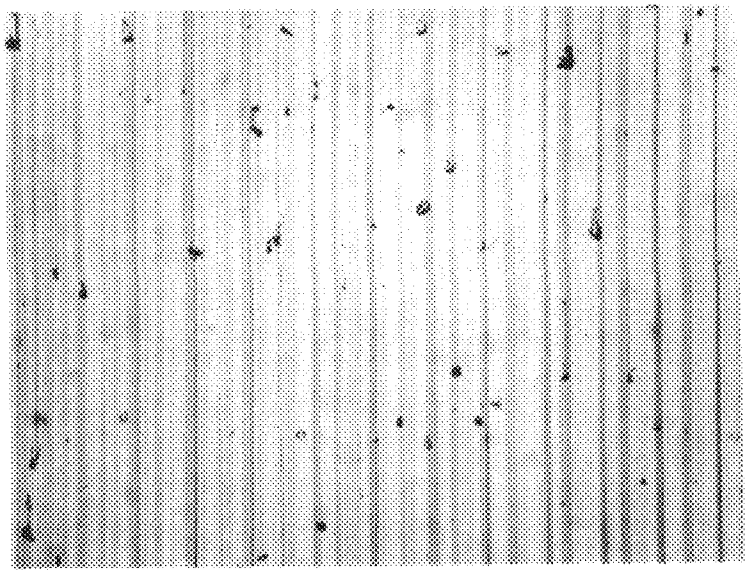
FIG. 4 is an enlarged photograph showing a surface condition of a substrate for photosensitive drum machined by the diamond turning tool having the cutting edge shown in FIG. 1.
Figure 5:
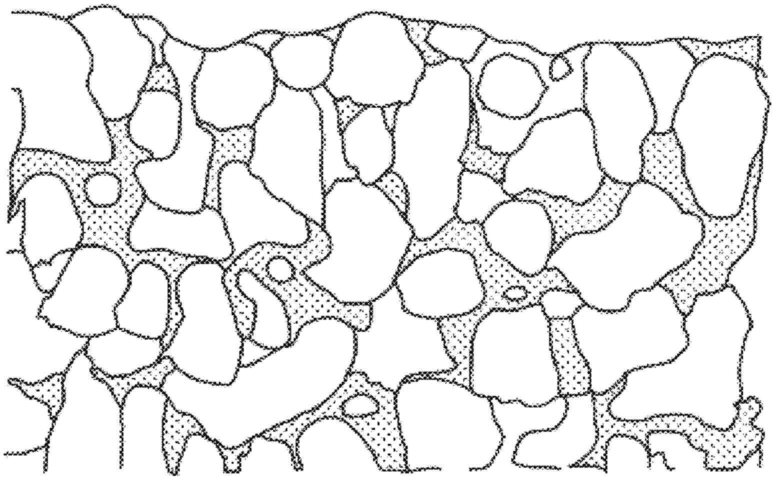
FIG. 5 is a schematic view showing a structure of a cutting edge of a conventional diamond turning tool used for the production of photosensitive drum.
Figure 6:
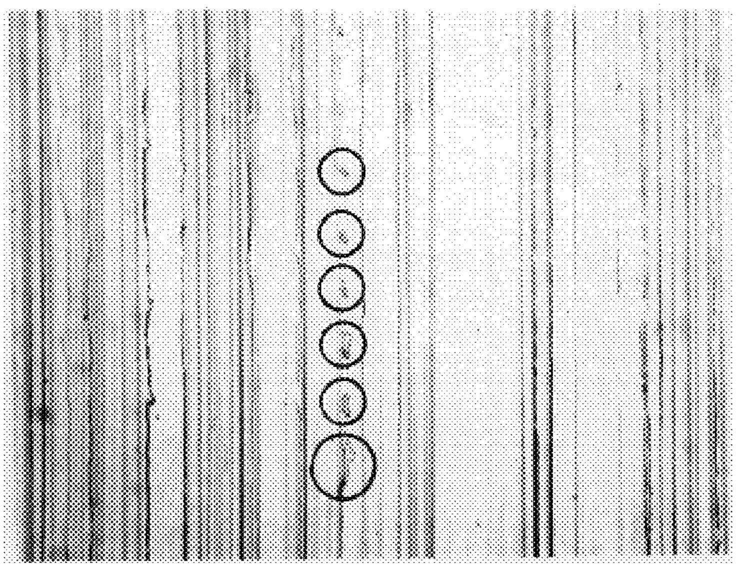
FIG. 6 is an enlarged photograph showing a surface condition of a substrate for photosensitive drum machined by a conventional diamond turning tool.
Figure 7:
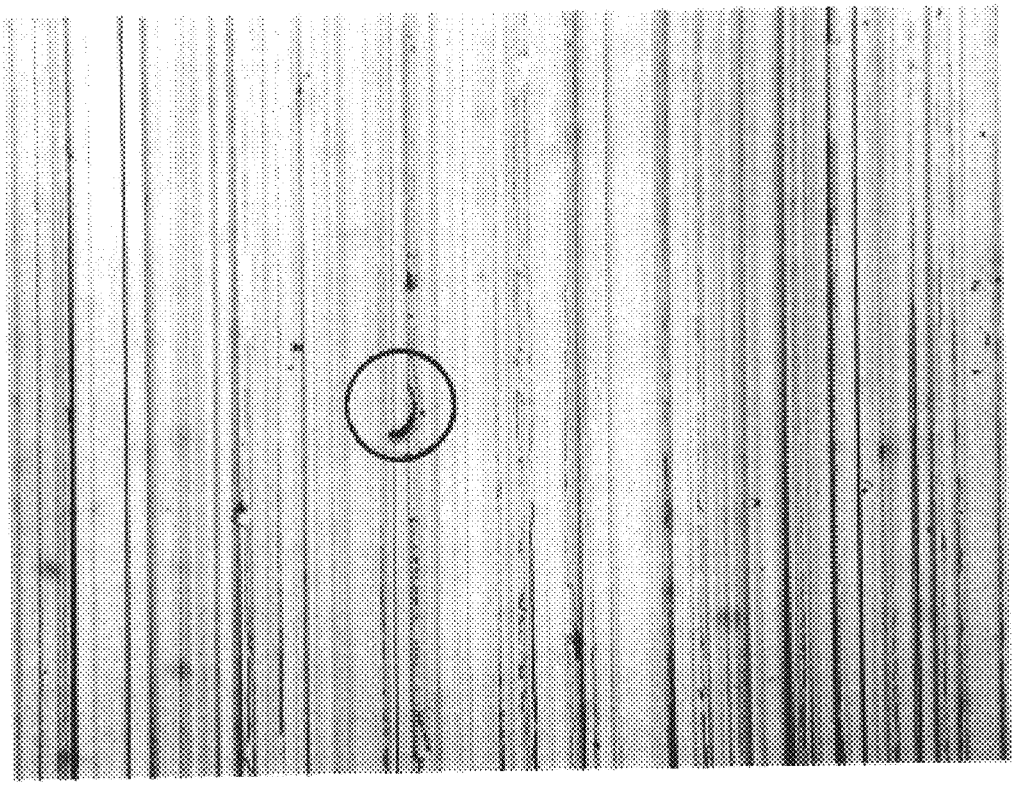
FIG. 7 is an enlarged photograph showing a surface condition of a substrate for photosensitive drum machined by a conventional diamond turning tool.

The preferred embodiments of the present invention will be described in detail by referring to the accompanying drawings. Referring to FIG. 1, there is shown a schematic view illustrating a structure of a cutting edge of a diamond turning tool used in the present invention as viewed from a tip rake face side thereof. FIG. 2 shows an enlarged photograph of saw-like portion formed on a flank of the diamond turning tool having the cutting edge as shown in FIG. 1. FIGS. 3 and 4 show enlarged photographs each illustrating a surface condition of the substrate for photosensitive drum which is machined by the diamond turning tool having the cutting edge as shown in FIG. 1. Meanwhile, in the following descriptions, the substrate for photosensitive drum is sometimes abbreviated merely to "substrate".

First, the process for producing the substrate for photosensitive drum according to the present invention will be explained. In the process of the present invention, the surface of a cylindrical stock tube is machined by a turning tool in order to form a cylindrical substrate for photosensitive drum having a surface roughness of usually 0.5 to 5 μm. In such a process, a specific turning tool is used to form the streaks extending along the approximately circumferential direction thereof.

A photosensitive drum (cylindrical electrophotographic photosensitive member) is produced by forming a photosensitive film on the surface of the thus obtained substrate (cylindrical substrate), and has an outer diameter of about 15 to 300 mm and a length of about 200 to 1,100 mm depending upon electrophotographic apparatuses to which the drum is applied. As the cylindrical stock tube to be machined into the substrate, there may be generally used those tubes made of aluminum or an aluminum alloy which are produced by drawing. The stock tube before being machined as described hereinafter, has a thickness of about 0.7 to 5 mm according to the desired relationship between the outer diameter or length and the rigidity of the obtained photosensitive drum.

The turning tool used in the present invention is constituted by monocrystalline diamond, and has a cutting edge on which saw-like portion are formed along an effective cutting length thereof. More specifically, in the present invention, there is used the turning tool which is constituted by monocrystalline diamond and formed into a specific shape. The use of such a turning tool ensures that the surface roughness of the substrate is adjusted to usually 0.5 to 5 μm and the streaks are formed along the approximately circumferential direction of the substrate, as described above. Meanwhile, the surface roughness may include a meaning of a difference in average maximum height of the projections and average minimum height of the concaves of the streaks as described hereinafter. In order to produce a practically usable photosensitive layer, it is required that the surface roughness of the substrate is adjusted to usually not more than 5 μm.

As well known in the arts, the tip of the finished turning tool is provided with a cutting edge (major cutting edge) constituted by a rake face and a flank (main flank) thereof, and a minor cutting edge constituted by the rake face and a front flank and extending in the direction of a plane approximately perpendicular to the major cutting edge. In the present invention, it is important that the turning tool used therein is provided at a tip thereof with such a cutting edge having a saw-like peripheral edge.

The saw-like portion of the cutting edge are produced by machining a tip of the turning tool into its outline shape and then polishing the obtained cutting edge by a polishing tool having fine grooves. Further, the saw-like portion of the cutting edge may be formed over the region extending from the cutting edge up to the rake face thereof. Moreover, as shown in FIG. 2, the saw-like portion of the cutting edge are preferably formed over the region extending from the cutting edge up to the flank thereof in order to smoothly discharge fine cut chips generated upon cutting therethrough.

Also, the cutting edge formed at the tip of the turning tool is required to have the above-specified surface roughness in order to finish the substrate with a smooth surface as a whole. However, from the standpoints of the formation of uniform streaks and the inhibition of occurrence of burrs, the projections and concaves of the saw-like portion formed on the cutting edge are preferably adjusted to predetermined heights and depths, respectively.

More specifically, as shown in FIG. 1, in order to form uniform streaks on the surface of the substrate, the projections of the saw-like portion formed at the cutting edge have a difference (Δh) in peak height between each projection usually 0 to 1 μm, and the concaves of the saw-like portion formed at the cutting edge have a difference (Δk) in minimum height between each concave of usually 0 to 1 μm. Further, in the case where an average peak height of the projections and an average minimum height of the concaves represent "H", and "K", respectively, in order to surely prevent the formation of burrs, the concaves of the saw-like portion formed at the cutting edge have an average depth (d) (i.e., a difference between an average peak height (H) of the projections and an average minimum height (K) of the concaves) of usually 0.5 to 5 μm based on an average peak height (H) of the projections. The peak height of the projections and minimum height of the concaves mean a height from a prescribed point, respectively. Meanwhile, the saw-like portion on the flank may be similarly formed.

In addition, in order to more effectively prevent the occurrence of interference fringes on the photosensitive layer, it is preferred that the streaks formed on the substrate have a predetermined density. Specifically, in the present invention, the projections of the saw-like portion formed at the cutting edge of the turning tool have a density (number of projections per unit length of the cutting edge) of usually 10 to 350 peaks/mm, preferably 50 to 350 peaks/mm. In other words, the distance between peaks of the adjacent projections at the cutting edge is in the range of usually 2.8 to 100 μm, preferably 2.8 to 20.0 μm. Also, each projection formed at the cutting edge has an approximately isosceles triangle shape having an apex angle of usually 30 to 175°, preferably 100 to 170°.

In the production of the substrate according to the present invention, from the standpoints of the reduction in costs due to wear of tools and the enhancement of machining efficiency, the surface of the stock tube is usually subjected to primary cutting process for finishing the surface thereof into a high-precision shape and then to a secondary cutting process for finishing the surface into such a shape as specified above. Upon the primary cutting process, the stock tube is usually machined using an R turning tool so as to smoothen the surface thereof into a surface roughness ($R_{max}$) of usually 5 to 15 μm. Then, the stock tube produced as an intermediate product by the primary cutting process is subjected to the secondary cutting process as a finishing process using the turning tool having the above-described monocrystalline diamond tip.

Upon the secondary cutting process, a work (intermediate product) is delivered at a feed speed of 0.05 to 0.5 mm/rev., while rotating the work at 2,000 to 10,000 rpm and, if required, using a coolant in an appropriate manner. When such a secondary cutting process takes place, there can be obtained the substrate which has the specific surface roughness and is provided with the above-specified fine streaks. Meanwhile, the stock tube as a raw material may be directly subjected to the finishing process using the above-specified turning tool if the shape precision (dimensional accuracy) and surface roughness of the raw material already lie in the predetermined ranges.

In the process of the present invention, when the stock tube is subjected to the finishing (secondary) cutting process, there is used the turning tool having a cutting edge constituted by monocrystalline diamond. The monocrystalline diamond cutting edge has a smoother peripheral edge and, therefore, a more excellent cutting quality as compared to those constituted by many particles of diamond which have an undesirably nicked peripheral edge due to the exposure of diamond particles to the surface thereof. In addition, since the predetermined saw-like portion are preliminarily formed along the cutting edge, more uniform fine streaks can be formed on the surface of the substrate without burrs. As a result, it is possible to produce a photosensitive drum having a higher quality which are free from defects of a photosensitive layer thereof.

Further, in the process of the present invention, since the cutting edge of the turning tool used therein has the saw-like portion formed over the region extending from the cutting edge up to the flank thereof, fine cut chips generated upon machining can be smoothly discharged through concaves or recesses of the saw-like portion, thereby surely preventing the formation of burrs.

Furthermore, in the process of the present invention, the cutting edge of the turning tool used therein is provided with saw-like portion whose projections have the specific difference in peak height and whose concaves have the specific depth, so that the respective cutting forces at the projections and concaves can be equalized, thereby more surely preventing the formation of burrs. Besides, since the projections of the saw-like portion formed at the cutting edge of the turning tool have the above-specified density, it is possible to produce such streaks capable of effectively inhibiting the occurrence of interference fringes on the photosensitive layer, on the surface of the substrate.

In FIGS. 3 and 4, there are shown the surface conditions of the substrate obtained by the process of the present invention. As shown in these figures, the substrate is provided on the surface thereof with the streaks extending in the approximately circumferential direction thereof, by machining the surface of the substrate using the above-specified turning tool having the cutting edge constituted by monocrystalline diamond. In the production of the substrate, an aluminum drawn tube having an outer diameter of 30.3 mm, an inner diameter of 28.5 mm and a length of 340 mm is used as a stock tube, and subjected to a primary cutting process using an R turning tool having many particles of diamond cutting edge. The thus machined tube is then finished (as a secondary cutting process) using the above turning tool in the form of a plain turning tool. The saw-like portion formed at the cutting edge of the plain turning tool are designed such that the projection thereof have a difference in peak height of 0.1 μm, the concaves thereof have an average depth of 1.3 μm based on an average peak height of the projections, and the apex angle of the projections is 160°.

In the finishing process (secondary cutting process), the respective parameters and conditions are adjusted as follows: front rake angle at the tip of turning tool: 0°; side rake angle: 10°; flank angle (front flank angle): 3°; rotational speed of work: 4,000 rpm; feed speed: 0.2 mm/rev.; and machining allowance: 0.015 mm. As a result, as shown in FIGS. 3 and 4, uniform streaks can be formed on the surface of the substrate without any burrs. The photosensitive drum produced by using the thus obtained substrate is completely free from occurrence of interference fringes.

That is, the substrate produced by the above process according to the present invention has a surface roughness of 0.5 to 5 μm, and is provided on its surface with the streaks extending in the approximately circumferential direction thereof without burrs by machining using the above-specified turning tool. Further, the substrate of the present invention having the above-specified surface roughness and the streaks extending in the approximately circumferential direction thereof enables the production of a photosensitive drum which is free from defects of a photosensitive layer as well as the occurrence of interference fringes thereon.

The substrate produced by the above process according to the preferred embodiment of the present invention, is provided on the surface thereof with streaks whose projections have a difference (Δh) in peak height between each projection of usually 0 to 1 μm, a difference (Δk) in minimum height between each concave of usually 0 to 1 μm, and whose concaves have an average depth of usually 0.5 to 5 μm. In the further preferred embodiment of the present invention, the streaks have a density of usually 10 to 350 peaks/mm, preferably 50 to 350 peaks/mm. The use of such a substrate produced according to the preferred embodiment is capable of producing a photosensitive drum which is surely prevented from generating interference fringes on a photosensitive layer thereof, and can exhibit a further enhanced quality.

As described above, in the process for producing a substrate for photosensitive drums according to the present invention, it is possible to form fine streaks on the surface of the substrate without burrs, thereby obtaining a substrate suitable for the production of such a photosensitive drum which is free from the occurrence of interference fringes on a photosensitive layer thereof. Further, the substrate produced by the above process according to the present invention can be used to produce a photosensitive drum which is free from defects of a photosensitive layer formed thereon as well as the occurrence of interference fringes, and exhibit a further enhanced quality.

What is claimed is:

1. A process for producing a substrate for a photosensitive drum, comprising machining a cylindrical stock tube by a turning tool to form a cylindrical substrate having a surface roughness of 0.5 to 5 μm and being provided on the surface thereof with the streaks extending in the approximately circumferential direction thereof, said turning tool being constituted by monocrystalline diamond and having a cutting edge comprising a plurality of alternating projections and concave regions.

2. A process according to claim 1, wherein the cutting edge comprising a plurality of alternating projections and concave regions is formed as to extend from the cutting edge up to a flank of the turning tool.

3. A process according to claim 1, wherein said plurality of alternating projections and concave regions formed along the cutting edge of the turning tool, have projections having a difference in peak height between each projection of 0 to 1 μm, and concave regions having a difference in minimum height between each concave of 0 to 1 μm and an average depth of 0.5 to 5 μm based on an average peak height of the projections.

4. A process according to claim 1, wherein said projections disposed along the cutting edge of the turning tool have a density of 10 to 350 peaks/mm.

5. A substrate for a photosensitive drum which is produced by the process as defined in claim 1, wherein the surface of the substrate comprises streaks extending in the approximately circumferential direction thereof without burrs, the streaks are formed from alternating surface projections and surface concave regions, the surface having a surface roughness of 0.5 to 5 μm, having a difference in peak height between each surface projection of 0 to 1 μm, a difference in minimum height between each surface concave region of 0 to 1 μm and an average depth of the surface concave regions of 0.5 to 5 μm based on an average peak height of the surface projections.

6. A substrate according to claim 5, wherein said streaks have a density of 10 to 350 peaks/mm.

* * * * *